Patented Jan. 6, 1948

2,434,061

UNITED STATES PATENT OFFICE 2,434,061

RACEMIZATION OF α-HYDROXY-β,β-DI-METHYL-GAMMA-BUTYROLACTONE

John Weijlard, Westfield, and John Paul Messerly, Clark Township, Union County, N. J., assignors to Merck & Co., Inc., Rahway, N. J., a corporation of New Jersey No Drawing. Application March 13, 1945, Serial No. 582,576

6 Claims. (Cl. 260—344)

This invention relates generally to improvements in processes for the preparation of organic chemical compounds and in a more particular sense is concerned with a method for converting an optical isomer into a racemic mixture of optical isomers.

This is a continuation-in-part of our copending application Serial No. 457,514, filed September 5, 1942, which matured into Patent No. 2,377,390 on June 5, 1945.

In the synthesis of organic chemical compounds that exist in enantiomorphous forms, both of the isomers normally are formed, usually in substantially equal quantities. This phenomenon acquires especial significance in industrial operations when one of the optical isomers of the substances synthesized is valuable and the other is substantially worthless, as for instance, α-gamma-dihydroxy-β,β-dimethyl-butyryl-β' - alanide, the dextro-rotatory form of which is pantothenic acid, a physiologically useful substance, whereas the laevo-rotatory isomer does not possess physiological activity.

The physiologically active dextro-rotatory isomer of this substance is prepared by condensation of a β-alanine derivative with laevo-rotatory α-hydroxy-β,β-dimethyl-gamma - butyrolactone; condensation of a β-alanine derivative with the dextro-rotatory lacetone yields the physiologically inactive laevo-rotatory isomer. When prepared by synthetic methods, the lactone is obtained as a mixture of the laevo-rotatory and the dextro-rotatory isomers which when resolved yields the desired laevo-rotatory isomer in pure state, the other isomer being obtained as a hitherto useless by-product. A need has been felt for utilization of this presently useless by-product, preferably by conversion, wholly or partially, to the useful laevo-rotatory isomer.

In the past attempts have been made to convert pure enantiomorphs into racemic mixtures of the enantiomorphous forms by continued heating at elevated temperatures and pressures and/or in certain instances, treatment with strong alkalis. These methods, when applied to dextro-rotatory α - hydroxy - β,β-dimethyl-gamma-butyrolactone, have proven unsatisfactory because of the small yields of desired product obtained and because of the relatively large investment in costly high-pressure equipment required.

The present invention is concerned with a method for converting dextro-rotatory α-hydroxy-β,β-dimethyl-gamma-butyrolactone into a racemic mixture of the enantiomorphous forms. In accordance with this invention, the dextro-rotatory lactone is converted to a racemate by refluxing the same under anhydrous conditions in the presence of a non-polar solvent, with an alkali metal carbonate or an alkali metal or alkaline earth metal hydroxide or quinidine. Xylene, pyridine and hydrocarbons such as petroleum naphtha, are typical non-polar solvents. Where conducted with a strong alkali such as sodium hydroxide in the absence of a solvent or in the presence of a polar solvent such as water, the reaction proceeds with explosive violence resulting in almost complete decomposition of the lactone. However, if a strong alkali is used together with a non-polar solvent, the reaction proceeds at a satisfactory rate and almost complete racemization of the lactone results. A satisfactory degree of racemization is obtained when the reaction mixture is heated at a temperature somewhat above the melting point of the lactone that is, above about 100° C., but below the boiling point of the lactone, that is below about 200° C.; it is presently preferred to employ, a temperature of the order of 125° C. The period of heating, broadly considered, is related to the temperature used and also is proportional to the degree of racemization desired. Periods of less than about twelve hours give yields distinctly less satisfactory than are obtained where the reaction mixture is heated twelve hours or more. The treatment does not require specialized high-pressure equipment and the yields of desired product is sufficiently high to make the process of commercial significance.

The following examples illustrate methods of carrying out the present invention but it is to be understood that these examples are given by way of illustration and not of limitation.

Example 1

32.5 g. (0.25 mole) of dextro-rotatory α-hydroxy - β,β - dimethyl - gamma - butyrolactone $(\alpha)_D = +50.3°$ and 17.5 g. (0.125 mole) of anhydrous potassium carbonate are mixed together and suspended in about 50 cc. of xylene. This suspension, after being heated to a temperature of 125–128° C. for 22 hrs. to racemize the lactone, is diluted with about 50 cc. of water and acidified with dilute hydrochloric acid using Congo red as an indicator. Most of the xylene solvent is then removed by distillation. The strongly acid residual liquid is heated for about an hour at a temperature of about 90° C. and then concentrated to dryness under vacuum, successively extracted with three 50 cc. portions of acetone and again dried under vacuum. The product obtained is racemic α-hydroxy-$\beta,\beta$-dimethyl-gamma-butyrolactone, $(\alpha)_D=+0.25°$ (corresponding to 99.5% racemization).

Example 2

About 32.5 g. (0.25 mole) of dextro-rotatory α - hydroxy - $\beta,\beta$-dimethyl-gamma-butyrolactone $(\alpha)_D=+50.3°$ is mixed with about 13.5 g. (0.125 mole) of anhydrous sodium carbonate and the mixture suspended in approximately 50 cc. of petroleum naphtha. This suspension is then treated in the same manner as the xylene suspension in Example 1. The product obtained is racemic α-hydroxy-$\beta,\beta$ - dimethyl - gamma - butyrolactone, $(\alpha)_D=+0.50°$ (corresponding to 99.0% racemization).

Example 3

About 32.5 g. (0.25 mole) of α-hydroxy-$\beta,\beta$-dimethyl-gamma-butyrolactone $(\alpha)_D=+50.3°$ is mixed with about 13.5 g. (0.125 mole) of anhydrous sodium carbonate and the mixture suspended in approximately 50 cc. of pyridine. This suspension is heated for 22 hours at a temperature of 125–128° C. to racemize the lactone. After being distilled under vacuum, the liquid is diluted with about 50 cc. of water and again distilled to remove most of the pyridine. The residual slurry from the second distillation is dissolved in approximately 50 cc. of water and acidified with concentrated hydrochloric acid until strongly acid to Congo red. After heating to a temperature of 90° C. for about one hour the mixture is successively extracted ten times with 100 cc. portions of ether. The combined ether filtrates are dried with anhydrous potassium carbonate, the ether distilled off and the residue dried under vacuum. The product obtained is racemic α-hydroxy-$\beta,\beta$-dimethyl - gamma - butyrolactone $(\alpha)_D=+0.10°$ (corresponding to 99.8% racemization).

Example 4

About 13 g. of crude dextro-rotatory α-hydroxy-$\beta,\beta$-dimethyl-gamma-butyrolactone $(\alpha)_D=+25°$, about 18 g. of anhydrous barium hydroxide and approximately 25 cc. of xylene are mixed together and, to racemize the lactone, the mixture is heated for 24 hours at 125–130° C. After cooling, the mixture is diluted with 25 cc. of water, acidified with dilute hydrochloric acid, using Congo red as an indicator and the solvent removed by distillation, water being added when necessary to maintain the water level. The aqueous solution is then concentrated to dryness under vacuum, the residue extracted three times with 25 cc. portions of ether and the combined ether extracts dried under vacuum. The product obtained is racemic α-hydroxy-$\beta,\beta$-dimethyl-butyrolactone $(\alpha)_D=+4°$.

Example 5

About 12.5 g. of dextro-rotatory α-hydroxy-$\beta,\beta$-dimethyl-gamma-butyrolactone $(\alpha)_D=+50.3°$ is mixed with approximately 17.5 g. of quinidine alkaloid and suspended in 50 cc. of xylene. This suspension is then heated at 125–130° C. for 24 hours to racemize the lactone, diluted with 50 cc. of water, acidified with 50% sulfuric acid using Congo red as an indicator and heated on a steam bath under vacuum for an hour to distill the solvent. The acid solution is concentrated to dryness, the residue is extracted four times with 25 cc. portions of ether and the combined filtrates dried under vacuum. The product obtained is α-hydroxy - $\beta,\beta$ - dimethyl - gamma - butyrolactone $(\alpha)_D=+3.6°$ (corresponding to 92.9% racemization).

Example 6

12.5 g. of dextro-rotatory α-hydroxy-$\beta,\beta$-dimethyl-gamma-butyrolactone $(\alpha)_D=+50.3°$ and 4.5 g. powdered sodium hydroxide are suspended in 25 cc. of xylene and the suspension is heated for 24 hours at a temperature of 125–130° C. to racemize the lactone. The suspension is then diluted with 25 cc. of water, and acidified with concentrated hydrochloric acid using Congo red as an indicator. The xylene is distilled from the solution which is then concentrated to dryness. The residual salt mass is extracted four times with 25 cc. portions of ether and the combined ether filtrates concentrated to dryness under vacuum. The product obtained is α-hydroxy-$\beta,\beta$-dimethyl-gamma-butyrolactone $(\alpha)_D=+3.3°$ (corresponding to 93.5% racemization).

Modifications may be made in carrying out the present invention without departing from the spirit and scope thereof and the invention is to be limited only by the appended claims.

What is claimed is:

1. The process for racemizing dextro-rotatory α-hydroxy-$\beta,\beta$-dimethyl-gamma - butyrolactone that comprises heating the lactone under substantially anhydrous conditions in the presence of a non-polar solvent and with a substance selected from the group consisting of alkali metal carbonates, alkali metal hydroxides and alkaline earth metal hydroxides, at a temperature above 100° C. and below about 200° C., for at least twelve hours.

2. The process for racemizing dextro-rotatory α-hydroxy-$\beta,\beta$-dimethyl-gamma - butyrolactone that comprises heating the lactone under substantially anhydrous conditions in the presence of a non-polar solvent and with an alkali-metal carbonate at a temperature above about 100° C. and below about 200° C., for at least twelve hours.

3. The process for racemizing dextro-rotatory α-hydroxy-$\beta,\beta$-dimethyl - gamma - butyrolactone that comprises heating the lactone under substantially anhydrous conditions in the presence of a non-polar solvent and with an alkali metal hydroxide at a temperature above about 100° C. and below about 200° C., for at least twelve hours.

4. The process for racemizing dextro-rotatory α-hydroxy-$\beta,\beta$-dimethyl - gamma - butyrolactone that comprises heating the lactone under substantially anhydrous conditions in the presence of xylene and with potassium carbonate at a temperature above about 100° C. and below about 200° C., for at least twelve hours.

5. The process for racemizing dextro-rotatory α-hydroxy-$\beta,\beta$-dimethyl - gamma - butyrolactone that comprises heating the lactone under substantially anhydrous conditions in the presence of pyridine and with sodium carbonate at a temperature above about 100° C. and below about 200° C., for at least twelve hours.

6. The process for racemizing dextro-rotatory α-hydroxy-$\beta,\beta$-dimethyl - gamma - butyrolactone that comprises heating the lactone under substantially anhydrous conditions in the presence of xylene and with sodium hydroxide at a temperature above about 100° C. and below about 200° C., for at least twelve hours.

JOHN WEIJLARD.
JOHN PAUL MESSERLY.

REFERENCES CITED

The following references are of record in the file of this patent:

UNITED STATES PATENTS

| Number | Name | Date |
|---|---|---|
| 2,377,390 | Weijlard et al. | June 5, 1945 |

OTHER REFERENCES

Journal of American Chemical Society, July 1940, pages 1785–1790.

Richter, Textbook of Organic Chemistry, Wiley and Sons, 1938, pages 334–335. (Copy in Div. 63.)